United States Patent
Kim et al.

(10) Patent No.: US 10,313,159 B2
(45) Date of Patent: Jun. 4, 2019

(54) DEVICE AND METHOD FOR DETECTING TRANSMISSION SIGNAL

(71) Applicant: Samsung Electronics Co., Ltd., Suwon-si, Gyeonggi-do (KR)

(72) Inventors: Yeongsam Kim, Seoul (KR); Youngkwan Choi, Seoul (KR); Hayoung Yang, Yongin-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,575

(22) PCT Filed: Apr. 6, 2016

(86) PCT No.: PCT/KR2016/003589
§ 371 (c)(1),
(2) Date: Oct. 10, 2017

(87) PCT Pub. No.: WO2016/163748
PCT Pub. Date: Oct. 13, 2016

(65) Prior Publication Data
US 2018/0123834 A1    May 3, 2018

(30) Foreign Application Priority Data
Apr. 10, 2015  (KR) .................. 10-2015-0050781

(51) Int. Cl.
*H04L 25/02*    (2006.01)
*H04L 25/03*    (2006.01)
(Continued)

(52) U.S. Cl.
CPC ......... *H04L 25/0222* (2013.01); *H04B 1/709* (2013.01); *H04L 25/02* (2013.01);
(Continued)

(58) Field of Classification Search
CPC ..... H04L 25/0222; H04L 25/02; H04L 25/03; H04L 27/2278; H04L 27/2334;
(Continued)

(56) References Cited

U.S. PATENT DOCUMENTS

| | | | |
|---|---|---|---|
| 5,757,846 | A | 5/1998 | Vasudevan |
| 5,767,738 | A | 6/1998 | Brown et al. |

(Continued)

FOREIGN PATENT DOCUMENTS

| | | |
|---|---|---|
| KR | 10-0737811 B1 | 7/2007 |
| KR | 10-0811843 B1 | 3/2008 |
| KR | 2011-0040018 A | 4/2011 |

OTHER PUBLICATIONS

"Decoding Algorithm with Fast Hadamard Transform for Channel Quality Indication (CQI) in 3GPP-LTE;" Li et al.; Beijing, China; 2010.

(Continued)

*Primary Examiner* — Dac V Ha
(74) *Attorney, Agent, or Firm* — Jefferson IP Law, LLP

(57) ABSTRACT

The present invention relates to a device and a method for detecting a transmission signal in a wireless communication system, and a reception device in a wireless communication system comprises: a transceiver for receiving a signal from a transmitting end; a first correlator for performing a first correlation and outputting a real part among the results of the first correlation; a second correlator for performing a second correlation and outputting an imaginary part among the results of the second correlation; and a control unit for controlling the first correlator and the second correlator on the basis of a channel change rate so as to detect a transmission signal.

20 Claims, 8 Drawing Sheets

(51) Int. Cl.
  *H04B 1/709* (2011.01)
  *H04L 27/227* (2006.01)
  *H04L 27/233* (2006.01)
  *H04B 1/7093* (2011.01)
  *H04L 1/00* (2006.01)
  *H04L 27/01* (2006.01)

(52) U.S. Cl.
  CPC ............ *H04L 25/03* (2013.01); *H04L 27/227* (2013.01); *H04L 27/2278* (2013.01); *H04L 27/233* (2013.01); *H04L 27/2334* (2013.01); *H04B 2001/70935* (2013.01); *H04L 1/0079* (2013.01); *H04L 27/01* (2013.01)

(58) Field of Classification Search
  CPC ... H04L 27/227; H04L 27/233; H04L 1/0079; H04L 27/01; H04B 1/709; H04B 2001/70935
  See application file for complete search history.

(56) References Cited

U.S. PATENT DOCUMENTS

| | | | | |
|---|---|---|---|---|
| 6,563,858 | B1* | 5/2003 | Fakatselis | H04B 1/707 375/148 |
| 6,744,754 | B1* | 6/2004 | Lee | H04W 52/16 370/252 |
| 7,164,649 | B2* | 1/2007 | Walton | H04L 1/0002 370/203 |
| 2006/0187885 | A1* | 8/2006 | Roy | H04L 1/0015 370/332 |
| 2008/0101303 | A1 | 5/2008 | Kim | |
| 2009/0135782 | A1 | 5/2009 | Litwin | |
| 2010/0035568 | A1 | 2/2010 | Ghosh | |
| 2010/0091907 | A1 | 4/2010 | Noh et al. | |
| 2012/0093208 | A1 | 4/2012 | Wu et al. | |
| 2013/0148611 | A1* | 6/2013 | Moulsley | H04B 7/024 370/329 |
| 2013/0176841 | A1 | 7/2013 | Gao et al. | |

OTHER PUBLICATIONS

3GPP 36.211, v. 14.4.0; 3rd Generation Partnership Project; Technical Specification Group Radio Access Network; Evolved Universal Terrestrial Radio Access (E-UTRA); Physical channels and modulation (Release 14); Valbonne; France; Sep. 2017.

* cited by examiner

DEVICE AND METHOD FOR DETECTING TRANSMISSION SIGNAL

CROSS-REFERENCE TO RELATED APPLICATION(S)

This application is a U.S. National Stage application under 35 U.S.C. § 371 of an International application filed on Apr. 6, 2016 and assigned application number PCT/KR2016/003589, which claimed the benefit of a Korean patent application filed on Apr. 10, 2015 in the Korean Intellectual Property Office and assigned Serial number 10-2015-0050781, the entire disclosure of each of which is hereby incorporated by reference.

TECHNICAL FIELD

The present invention relates to a device and a method for detecting a transmission signal in a wireless communication system.

BACKGROUND ART

Examples of a method of detecting a transmission signal in a wireless communication system may include a coherent method and a non-coherent method. That is, a reception device for detecting a transmission signal in a wireless communication system can be implemented as a coherent receiver or a non-coherent receiver. In this case, since the coherent receiver and the non-coherent receiver differ as to the implementation forms and performance thereof, it is necessary to use an appropriate method for detecting a transmission signal depending on a wireless communication environment.

DETAILED DESCRIPTION OF THE INVENTION

Technical Problem

Therefore, the present invention has been made in view of the above-mentioned problems, and an aspect of the present invention is to provide a device and a method for detecting a transmission signal in a wireless communication system.

Another aspect of the present invention is to provide a device and a method for detecting a transmission signal based on a channel change rate in a wireless communication system.

Still another aspect of the present invention is to provide a device and a method for detecting a transmission signal through a coherent reception scheme when a channel change rate is equal to or greater than a threshold in a wireless communication system.

Yet another aspect of the present invention is to provide a device and a method for detecting a transmission signal through a non-coherent reception scheme when a channel change rate is less than a threshold in a wireless communication system.

A further aspect of the present invention is to provide a device and a method for detecting a transmission signal by applying a fuse Hadamard transform (FHT) structure in a wireless communication system.

Technical Solution

In accordance with an aspect of the present invention, there is provided a reception device in a wireless communication system, including: a transceiver configured to receive a signal from a transmission terminal; a first correlator configured to perform a first correlation operation and to output a real part of a result of the first correlation operation; a second correlator configured to perform a second correlation operation and to output an imaginary part of a result of the second correlation operation; and a control unit configured to detect a transmission signal by controlling the first correlator and the second correlator, based on a channel change rate.

In accordance with another aspect of the present invention, there is provided a method of operating a reception device in a wireless communication system, including: receiving a signal from a transmission terminal; determining a real part of a result of a first correlation operation; determining an imaginary part of a result of a second correlation operation; and detecting a transmission signal based on a channel change rate, the real part, and the imaginary part.

Advantageous Effects

A device and a method for detecting a transmission signal in a wireless communication system according to embodiments of the present invention as described above may realize superior reception performance by changing a reception scheme according to each channel environment when the transmission signal is detected based on a channel change rate.

MODE FOR CARRYING OUT THE INVENTION

Figure 1:
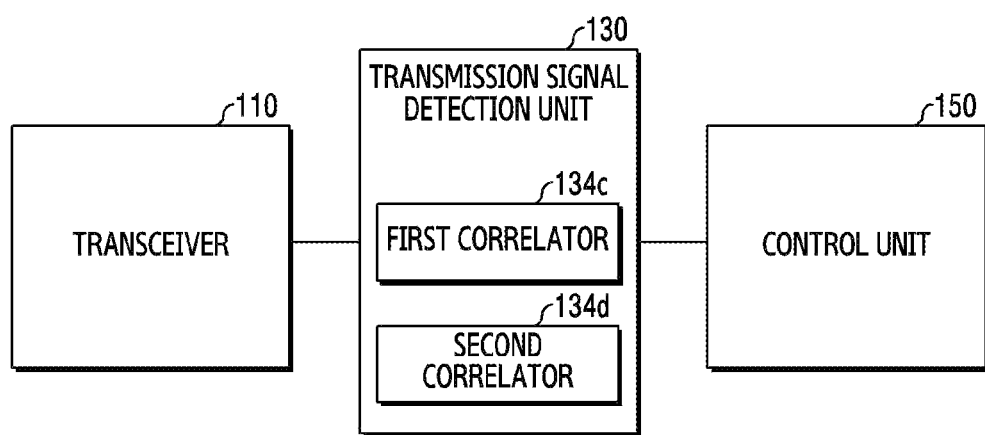
FIG. 1 shows the configuration of a reception device according to an embodiment of the present invention.

Hereinafter, the operating principle of the present invention will be described in detail with reference to the accompanying drawings. In describing the present invention below, a detailed description of related known configurations or functions incorporated herein will be omitted when it is determined that the detailed description thereof may unnecessarily obscure the subject matter of the present invention. The terms which will be described below are terms defined in consideration of the functions in the present invention, and may be different according to users, intentions of the users, or customs. Therefore, the terms should be substantially defined on the basis of the details throughout the specification.

The present invention may have various embodiments, and modifications and changes may be made therein. Therefore, the present invention will be described in detail with reference to particular embodiments shown in the accompanying drawings. However, it should be understood that there is no intent to limit various embodiments of the present invention to the particular embodiments disclosed herein, but the present invention should be construed to cover all modifications, equivalents, and/or alternatives falling within the spirit and scope of the various embodiments of the present invention. In describing the drawings, similar reference numerals are used to designate similar elements.

As used in various embodiments of the present invention, the expressions "include", "may include", and other conjugates refer to the existence of a corresponding disclosed function, operation, or constituent element, and do not limit one or more additional functions, operations, or constituent elements. Further, as used in embodiment of the present invention, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present invention, the expression "or" includes any or all combinations of words enumerated together. For example, the expression "A or B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the corresponding constituent elements. The above-described expressions may be used to distinguish an element from another element. For example, a first user device and a second user device indicate different user devices although both of them are user devices. For example, a first element may be termed a second element, and likewise a second element may also be termed a first element without departing from the scope of various embodiments of the present invention.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used in various embodiments of the present invention are merely for the purpose of describing particular embodiments and are not intended to limit the various embodiments of the present invention. As used herein, the singular forms are intended to include the plural forms as well, unless the context clearly indicates otherwise.

Unless defined otherwise, all terms used herein, including technical terms and scientific terms, have the same meaning as commonly understood by a person of ordinary skill in the art to which various embodiments of the present invention pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present invention.

Throughout the following description, a device and a method for detecting a transmission signal in a wireless communication system will be described. The wireless communication system according to an embodiment of the present invention may include a cellular system, for example, a Long-Term Evolution (LTE) wireless communication system or a World Interoperability for Microwave Access (WiMAX) wireless communication system. Also, the wireless communication system includes a base station device and a terminal device, and the base station device may include an evolved NodeB (eNB), and the terminal device may include an "user equipment (UE)".

FIG. 1 shows the configuration of a reception device according to an embodiment of the present invention. The reception device may be included in the base station device included in the wireless communication system. Here, the reception device may include a transceiver 110, a transmission signal detection unit 130, and a control unit 150. Terms used below such as '. . . unit,' '. . . -or (-er),' and the like denote a unit for processing at least one function or operation, and may be implemented by hardware, software, or a combination of hardware and software.

Specifically, the transceiver 110 may perform a function of transmitting or receiving a signal to or from a transmission terminal through a wireless channel. For example, the transceiver 110 may down-convert a radio-frequency (RF) band signal received through an antenna into a baseband signal. In addition, the transceiver 110 may include a transmission filter, a reception filter, an amplifier, a mixer, an oscillator, a digital-to-analog converter (DAC), an analog-to-digital converter (ADC), and the like. In this case, the transceiver 110 may be referred to as a transmission unit, a reception unit, a transmission/reception unit, a communication unit, or a wireless communication unit.

According to the present embodiment of the present invention, the transceiver 110 may receive a signal transmitted from the transmission terminal.

Also, the transmission signal detection unit 130 may detect a transmission signal from the signal transmitted from the transmission terminal. Here, the transmission signal detection unit 130 may be included in a modulator/demodulator (MODEM) device included in the base station device. Specifically, the transmission signal detection unit 130 may include a first correlator 134c and a second correlator 134d. Here, the first correlator 134c and the second correlator 134d may perform correlation. Specifically, the first correlator 134c may perform a first correlation operation and output a real part of the result of the first correlation operation. Also, the second correlator 134d may perform a second correlation operation and output an imaginary part of the result of the second correlation operation.

The control unit 150 may control the overall operations of the reception device. For example, the control unit 150 may transmit and receive signals through the transceiver 110. Also, for this purpose, the control unit 150 may include at least one processor. For example, the control unit 150 may include a communication processor (CP) for performing control for communication and an application processor (AP) for controlling an upper layer such as an application.

According to various embodiments of the present invention, the control unit 150 may detect a transmission signal transmitted from the transmission terminal by controlling the first correlator 134c and the second correlator 134d based on a channel change rate.

The specific operation of the reception device will be described in more detail in FIG. 2 below.

Figure 2:
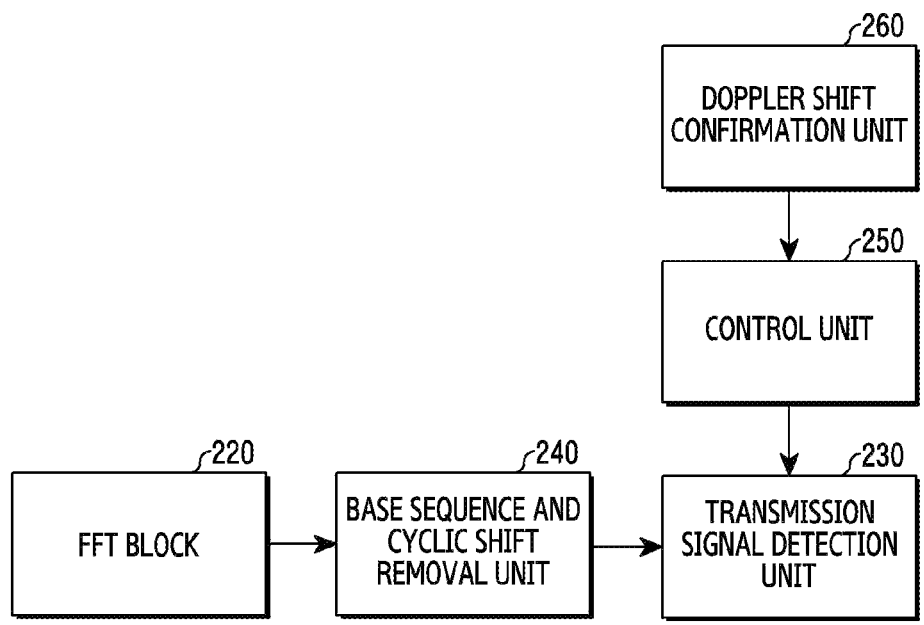
FIG. 2 shows the configuration of a reception device according to another embodiment of the present invention.

FIG. 2 shows the configuration of a reception device according to another embodiment of the present invention.

Referring to FIG. 2, a receiver according to the embodiment of the present invention includes a fast Fourier transform (FFT) block 220, a base sequence and cyclic shift removal unit 240, a transmission signal detection unit 230, a control unit 250, and a Doppler shift confirmation unit 260. Here, the transmission signal detection unit 230 corresponds to the transmission signal detection unit 130 of FIG. 1, and the control unit 250 corresponds to the control unit 150 of FIG. 1.

According to the embodiment of the present invention, a signal transmitted from a transmission terminal may be input to the FFT block 220 via the transceiver 110. Here, the FFT block 220 may perform a fast Fourier transform operation. In other words, the FFT block 220 may convert a time-domain signal input to the FFT block 220 into a frequency-domain signal through the fast Fourier transform operation.

In addition, the base sequence and cyclic shift removal unit 240 may receive the signal output from the FFT block 220 as an input to remove a base sequence and a cyclic shift. At this time, the base sequence and cyclic shift removal unit 240 may be referred to as a base sequence and cyclic shift de-correlator. Here, the base sequence and the cyclic shift are values assigned for the purpose of lowering the amount of interference per cell or multiplexing of terminals, and are defined by a 3GPP 36.211 standard [1]. In this case, the cyclic shift is unique for each terminal.

When an i-th reception symbol, from which the base sequence and the cyclic shift are completely removed through the base sequence and cyclic shift removal unit 240, is $y_i$, the reception symbol may be defined as the following Equation 1.

$$y_i = h_i c_i + n_i \qquad \text{Equation 1}$$

Here, $h_i$ denotes a channel of the i-th reception symbol, $c_i$ denotes an i-th encoded transmission signal, and $n_i$ denotes a thermal noise of the i-th reception symbol.

According to the embodiment of the present invention, the reception device may receive a signal from the transmission terminal through an uplink control channel in a wireless communication system. For example, when the wireless communication system complies with an LTE standard, the uplink control channel may include a physical uplink control channel (PUCCH). According to the embodiment of the present invention, 14 symbols may be present in one subframe based on a normal cyclic prefix (CP), and the 14 symbols may include 10 data symbols and 4 demodulation reference symbols (DMRSs).

The Doppler shift confirmation unit 260 may confirm a Doppler shift of the signal received from the transmission terminal Here, the Doppler shift refers to a change in an observed frequency of a signal due to the Doppler effect. According to the embodiment of the present invention, the Doppler shift confirmation unit 260 may confirm a change in the frequency of the signal received from the transmission terminal, and may transmit a frequency change value of the signal received from the transmission terminal to the control unit 250.

Accordingly, the control unit 250 may receive the frequency change value of the signal from the Doppler shift confirmation unit 260, and may determine an environment of the channel through which the signal is transmitted based on the frequency change value of the signal. For example, when the frequency change value of the signal received from the transmission terminal, that is, a Doppler shift value, is equal to or greater than a threshold value, the control unit 250 may determine that the environment of the channel through which the signal is transmitted is relatively quickly changed. In other words, the control unit 250 may determine that the environment of the channel through which the signal is transmitted is a high-speed channel environment. For example, when the terminal that transmits the signal moves at a relatively high speed, the frequency change value may be determined to be equal to or greater than the threshold value. As a result, the control unit 250 may determine that the environment of the channel through which the signal is transmitted is a high-speed channel environment.

In addition, when the frequency change value of the signal received from the transmission terminal is less than the threshold value, the control unit 250 may determine that the environment of the channel through which the signal is transmitted is changed relatively slowly. In other words, the control unit 250 may determine that the environment of the channel through which the signal is transmitted is a low-speed channel environment. For example, when the terminal that transmits the signal is stationary or moves at a relatively slow speed, the frequency change value may be determined to be less than the threshold value. As a result, the control unit 250 may determine that the environment of the channel through which the signal is transmitted is a low-speed environment.

In the above embodiment, the control unit 250 determines the environment of the channel based on the Doppler shift of the signal received from the transmission terminal, that is, the frequency change value. However, the environment of the channel may be determined based on a Doppler shift of a signal received via a channel through which the signal received from the transmission terminal is currently passed, for example, a Doppler shift of a signal received via another channel, such as a data channel, rather than a control channel. When the wireless communication system according to the embodiment of the present invention complies with the LTE standard, the data channel may include a physical uplink shared channel (PUSCH). Also, the control unit 250 may receive the Doppler shift value from an upper node.

In addition, under the control of the control unit 250, the transmission signal detection unit 230 may detect a transmission signal from the i-th reception symbol $y_i$ from which the base sequence and the cyclic shift are completely removed through the base sequence and cyclic shift removal unit 240, based on current channel environment information determined above. The detailed process by which the transmission signal detection unit 230 detects the transmission signal in this manner will be described in more detail with reference to FIG. 3.

Figure 3:
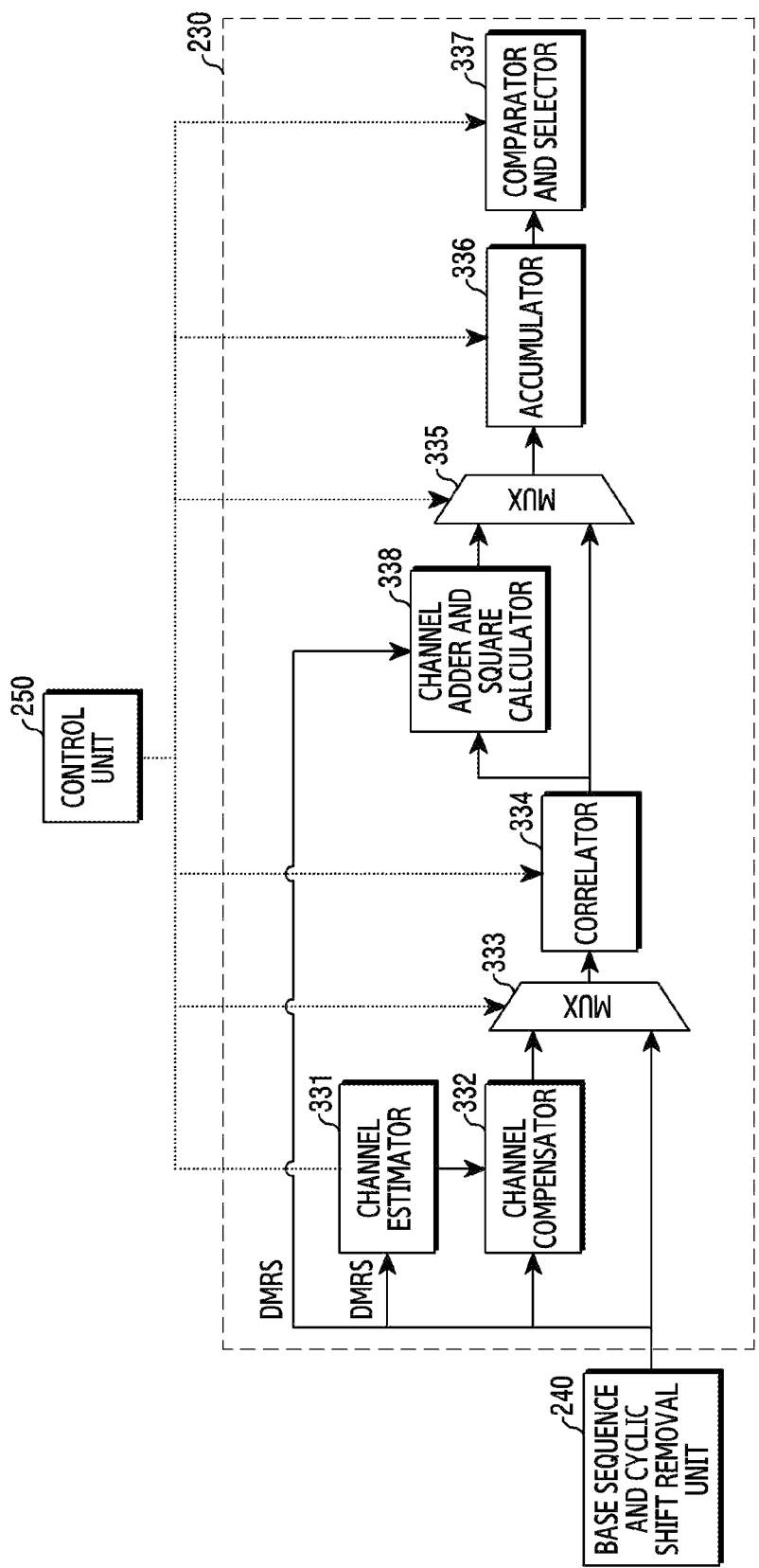
FIG. 3 shows the configuration of a transmission signal detection unit included in a reception device according to an embodiment of the present invention.

FIG. 3 shows the configuration of a transmission signal detection unit included in a reception device according to an embodiment of the present invention.

Referring to FIG. 3, the reception device may include the transmission signal detection unit 230, the base sequence and cyclic shift removal unit 240, and the control unit 250.

Here, the base sequence and cyclic shift removal unit 240 corresponds to the base sequence and cyclic shift removal unit 240 of FIG. 2. In this case, the base sequence and cyclic shift removal unit 240 may receive a signal output from the FFT block 220 shown in FIG. 2 as an input to remove a base sequence and a cyclic shift. Also, the base sequence and cyclic shift removal unit 240 may output the reception symbol $y_i$ as shown in Equation 1 to the transmission signal detection unit 230.

In addition, the control unit 250 corresponds to the control unit 150 shown in FIG. 1 and the control unit 250 shown in FIG. 2. Here, the control unit 250 may receive, from the Doppler shift confirmation unit 260 shown in FIG. 2, a frequency change value of a signal transmitted from the transmission terminal, and may determine the environment of the channel through which the signal is transmitted based on the frequency change value of the signal. For example, when the frequency change value of the signal received from the transmission terminal is equal to or greater than a threshold value, the control unit 250 may determine that the environment of the channel through which the signal is transmitted is changed relatively quickly. In other words, the control unit 250 may determine that the environment of the channel through which the signal is transmitted is a high-speed channel environment. For example, when the terminal that transmits the signal moves at a relatively high speed, the frequency change value may be determined to be equal to or greater than the threshold value. As a result, the control unit 250 may determine the environment of the channel through which the signal is transmitted to be a high-speed channel environment.

In addition, when the frequency change value of the signal received from the transmission terminal is less than the threshold value, the control unit 250 may determine that the environment of the channel through which the signal is transmitted is changed relatively slowly. In other words, the control unit 250 may determine that the environment of the channel through which the signal is transmitted is a low-speed channel environment. For example, when the terminal that transmits the signal is stationary or moves at a relatively slow speed, the frequency change value may be determined to be less than the threshold value. As a result, the control unit 250 may determine the environment of the channel through which the signal is transmitted to be a low-speed environment. In this manner, the control unit 250 may control the transmission signal detection unit 230 based on channel environment information determined from the frequency change value of the signal.

As shown in FIG. 3, the transmission signal detection unit 230 may include a channel estimator 331, a channel compensator 332, a first multiplexer (MUX) 333, a correlator 334, a channel adder and square calculator 338, a second MUX 335, an accumulator 336, and a comparator and selector 337.

In general, a coherent receiver restores a transmission signal through channel estimation, and includes a channel estimation and compensation block. On the other hand, a non-coherent receiver restores a transmission signal without performing channel estimation, and includes a block such as a correlator. In the embodiment of the present invention, the transmission signal detection unit 230 is obtained by integrally implementing the structure of the coherent receiver and the structure of the non-coherent receiver.

According to the embodiment of the present invention, when the environment of the channel through which the signal is transmitted is determined to be the high-speed channel environment by the control unit 250, the control unit 250 may control the channel estimator 331, the channel compensator 332, the first MUX 333, the correlator 334, the second MUX 335, and the comparator and selector 337, which are included in the transmission signal detection unit 230, to perform respective operations thereof. In particular, the channel estimator 331 may perform channel estimation on the data symbol included in the reception symbol $y_i$, based on DMRSs included in the reception symbol $y_i$ output from the base sequence and cyclic shift removal unit 240. In addition, the channel estimator 331 may output a channel estimation value related to the data symbol included in the reception symbol $y_i$ to the channel compensator 332. Here, the channel compensator 332 may perform channel compensation on the reception symbol $y_i$ using the channel estimation value. Specifically, the channel compensator 332 may output a result value, obtained by multiplying the reception symbol $y_i$ by the channel estimation value, to the first MUX 333.

In general, a MUX refers to a device that performs a function of receiving multiple signals and sending them to a single line, or separating the signals in the single line back into original signals. According to the embodiment of the present invention, when the environment of the channel through which the signal is transmitted is determined to be the high-speed channel environment by the control unit 250, the first MUX 333 may output the input result value, obtained by multiplying the reception symbol $y_i$ by the channel estimation value, to the correlator 334.

Here, the correlator 334 may perform a correlation operation on the result value obtained by multiplying the reception symbol $y_i$ by the channel estimation value. According to the embodiment of the present invention, the reception symbol $y_i$ may be received via a control channel (e.g., PUCCH) in a wireless communication system. Here, the symbol $y_i$ may include 14 symbols on the basis of one subframe, and 10 symbols among them may be determined to be data symbols and the remaining 4 symbols may be determined to be DMRSs. In this case, the correlator 334 may output accumulated result values obtained by multiplying the result value, obtained by multiplying the reception symbol $y_i$ by the channel estimation value, by a codeword, to the second MUX, and the second MUX may output the accumulated result values, obtained by multiplying the result value, obtained by multiplying the reception symbol $y_i$ by the channel estimation value, by the codeword, to the comparator and selector 337. In this case, the comparator and selector 337 may perform a comparison operation to determine a codeword corresponding to a maximum value among the accumulated result values obtained by multiplying the result value, obtained by multiplying the reception symbol $y_i$ by the channel estimation value, by the codeword to be the transmission signal. This process may be summarized by the following equation 2.

$$\arg k \max Re\{\Sigma_{i=0}^{9}[\hat{h}^*_i y_i]c^*_{i,k}\} \quad \text{Equation 2}$$

Here, i denotes an index of the data symbol excluding the DMRS, $y_i$ denotes an i-th reception symbol, $\hat{h}^*_i$ denotes a channel estimation value for the i-th reception symbol, and $c^*_{i,k}$ denotes an i-th symbol of a k-th codeword.

In other words, when the environment of the channel through which the signal is transmitted is determined to be the high-speed channel environment by the control unit 250, the channel estimator 331 may perform channel estimation on the data symbol included in the reception symbol $y_i$ based on the DMRS included in the reception symbol $y_i$ output from the base sequence and cyclic shift removal unit 240, and thereby output the channel estimation value $\hat{h}^*_i$ for the i-th reception symbol to the channel compensator 332. Here, the channel compensator 332 may perform channel compensation on the reception symbol $y_i$ using the channel estimation value, and thereby output a value of $[\hat{h}^*_i y_i]$ to the first MUX 333.

The first MUX 333 may output the value of $[\hat{h}^*_i y_i]$ to the correlator 334, the correlator 334 may output a value of $\mathrm{Re}\{\Sigma_{i=0}^{9}[\hat{h}^*_i y_i]c^*_{i,k}\}$ to the comparator and selector 337 through a correlation operation, and the comparator and selector 337 may perform a comparison operation on the values of $\mathrm{Re}\{\Sigma_{i=0}^{9}[\hat{h}^*_i y_i]c^*_{i,k}\}$ through Equation 2 and thereby output a codeword corresponding to a maximum value among the values of $\mathrm{Re}\{\Sigma_{i=0}^{9}[\hat{h}^*_i y_i]c^*_{i,k}\}$ as the transmission signal.

According to another embodiment of the present invention, when the environment of the channel through which the signal is transmitted is determined to be a high-speed channel environment by the control unit 250, 10 data symbols included in the reception symbol $y_i$ are divided into two slots on the basis of one subframe, and the above-described operation may be performed in units of 5 data symbols. In this case, the control unit 250 may control the accumulator 336 to operate, and the accumulator 336 may accumulate a value of $$\mathrm{Re}\left(\sum_{\substack{i=0 \\ i \neq 1,5}}^{6} [\hat{h}^*_i y_i] c^*_{i,k}\right)$$

output from the correlator 334 to correspond to a first slot and a value of $$\mathrm{Re}\left(\sum_{\substack{i=7 \\ i \neq 8,12}}^{13} [\hat{h}^*_i y_i] c^*_{i,k}\right)$$

output from the correlator 334 to correspond to a second slot, and output the accumulated values to the comparator and selector 337. In this case, the comparator and selector 337 may determine a codeword corresponding to a maximum value among the accumulated values to be the transmission signal based on the value accumulated for all the slots.

According to the embodiment of the present invention, when the environment of the channel through which the signal is transmitted is determined to be the low-speed channel environment by the control unit 250, the control unit 250 may control the first MUX 333, the correlator 334, the channel adder and square calculator 338, the second MUX 335, the accumulator 336, and the comparator and selector 337, which are included in the transmission signal detection unit 230, to perform the respective operations thereof.

According to the embodiment of the present invention, when the reception symbol $y_i$ is received through a control channel (e.g., PUCCH), a correlation operation should be performed for each slot in order to determine the transmission signal, due to a slot-hopping phenomenon that occurs due to the characteristics of the control channel. In other words, according to the embodiment of the present invention, when 14 symbols are present in the reception symbol $y_i$ on the basis of one subframe, 10 symbols among them are determined to be data symbols, and the remaining 4 symbols are determined to be DMRSs, two slots may be determined in units of 5 data symbols.

In this case, in order to perform a correlation operation on symbols included in a first slot, the control unit 250 may control the first MUX 333, the correlator 334, the channel adder and square calculator 338, and the second MUX 335, which are included in the transmission signal detection unit 230, so as to operate. In addition, in order to perform a correlation operation on symbols included in a second slot, the control unit 250 may control the first MUX 333, the correlator 334, the channel adder and square calculator 338, and the second MUX 335, which are included in the transmission signal detection unit 230, to repeatedly operate. According to the embodiment of the present invention, in order to simultaneously perform a correlation operation for each slot, the transmission signal detection unit 230 may be implemented such that each of the first MUX 333, the correlator 334, the channel adder and square calculator 338, and the second MUX 335, which are included in the transmission signal detection unit 230, is present in a number equal to the number of slots.

Specifically, when the environment of the channel through which the signal is transmitted is determined to be the low-speed channel environment by the control unit 250, the control unit 250 may perform control so that a correlation operation is performed on the data symbols included in the first slot. According to the embodiment of the present invention, when 14 symbols are present in the reception symbol $y_i$ on the basis of one subframe, 10 symbols among them are determined to be data symbols, and the remaining 4 symbols are determined to be DMRSs, 5 data symbols and two DMRSs may be included in the first slot. For example, in the first slot, a second symbol (i=1) and a sixth symbol (i=5) may be determined to be DMRSs, and a first symbol (i=0), a third symbol (i=2), a fourth symbol (i=3), a fifth symbol (i=4), and a seventh symbol (i=6) may be determined to be data symbols.

In this case, the control unit 250 may output only the data symbols included in the first slot, among the reception symbol $y_i$ output from the base sequence and cyclic shift removal unit 240, to the first MUX 333. In other words, the base sequence and cyclic shift removal unit 240 may output the first symbol (i=0), the third symbol (i=2), the fourth symbol (i=3), the fifth symbol (i=4), and the seventh symbol (i=6), among symbols in the first slot, to the first MUX 333.

According to the embodiment of the present invention, when the environment of the channel through which the signal is transmitted is determined to be the low-speed channel environment by the control unit 250, the first MUX 333 may output the data symbols included in the first slot to the correlator 334. Here, the correlator 334 may perform a correlation operation on the input data symbols included in the first slot. In other words, the correlator 334 may output a result value, obtained by multiplying each of the data symbols included in the first slot by a codeword and then accumulating the multiplied values, to the channel adder and square calculator 338.

Here, the channel adder and square calculator 338 may add a channel value to a result value obtained by multiplying each of the data symbols included in the first slot by the codeword. In other words, the channel adder and square calculator 338 may add a channel value of the DMRS included in the first slot to the result value obtained by multiplying each of the data symbols included in the first slot by the codeword. In addition, the channel adder and square calculator 338 may output a result value obtained by squaring a result value obtained by adding the channel value thereto, to the second MUX 335, and the second MUX 335 may output the result value obtained by squaring the result value obtained by adding the channel value thereto, to the accumulator 336.

In addition, the control unit 250 may perform control so that a correlation operation is performed on the data symbols included in the second slot. According to the embodiment of the present invention, when 14 symbols are present in the reception symbol $y_i$ on the basis of one subframe, 10 symbols among them are determined to be data symbols, and the remaining 4 symbols are determined to be DMRSs, 5 data symbols and 2 DMRSs may be included in the second slot. For example, in the second slot, a second symbol (i=8) and a sixth symbol (i=12) may be determined to be the DMRSs, and a first symbol (i=7), a third symbol (i=9), a fourth symbol (i=10), a fifth symbol (i=11), and a seventh symbol (i=13) may be determined to be the data symbols.

In this case, the control unit 250 may output only the data symbols included in the second slot, among the reception symbol $y_i$ output from the base sequence and the cyclic shift removal unit 240, to the first MUX 333. In other words, the base sequence and cyclic shift removal unit 240 may output the first symbol (i=7), the third symbol (i=9), the fourth symbol (i=10), the fifth symbol (i=11), and the seventh symbol (i=13), among symbols in the second slot, to the first MUX 333.

According to the embodiment of the present invention, when the environment of the channel through which the signal is transmitted is determined to be a low-speed channel environment by the control unit 250, the first MUX 333 may output the data symbols included in the first slot to the correlator 334. Here, the correlator 334 may perform a correlation operation on the input data symbols included in the second slot. In other words, the correlator 334 may output a result value, obtained by multiplying each of the data symbols included in the second slot by a codeword and then accumulating the multiplied values, to the channel adder and square calculator 338.

Here, the channel adder and square calculator 338 may add a channel value to a result value obtained by multiplying each of the data symbols included in the second slot by the codeword. In other words, the channel adder and square calculator 338 may add a channel value of the DMRS included in the second slot to the result value obtained by multiplying each of the data symbols included in the second slot by the codeword. In addition, the channel adder and square calculator 338 may output a result value, obtained by squaring a result value obtained by adding the channel value thereto, to the second MUX 335, and the second MUX 335 may output the result value, obtained by squaring the result value obtained by adding the channel value thereto, to the accumulator 336.

Consequently, the accumulator 336 may accumulate a value output from the second MUX 335 for the first slot and a value output from the second MUX 335 for the second slot. In other words, the accumulator 336 may add a first result value and a second result value, and may output the result of addition to the comparator and selector 337. Here, the first result value is obtained by adding the value obtained by multiplying each of the data symbols included in the first slot by the codeword and the channel value of the DMRS included in the first slot and then squaring the added result. The second result value is obtained by adding the value, obtained by multiplying each of the data symbols included in the second slot by the codeword, and the channel value of the DMRS included in the second slot and then squaring the added result. In this case, the comparator and selector 337 may perform a comparison operation, and thereby may determine a codeword corresponding to a maximum value among values obtained by accumulating the first result value and the second result value to be the transmission signal. This process may be summarized by the following equation 3.

$$\arg k\max\left\{\left|\left(\sum_{\substack{i=0\\i\neq 1,5}}^{6}y_i c_{i,k}^*\right)+2\hat{h}_0\right|^2+\left|\left(\sum_{\substack{i=7\\i\neq 8,12}}^{13}y_i c_{i,k}^*\right)+2\hat{h}_1\right|^2\right\} \quad \text{Equation 3}$$

Here, i denotes an index of a symbol, $y_i$ denotes an i-th reception symbol, $c_{i,k}^*$ denotes an i-th symbol of a k-th codeword, $\hat{h}_0$ denotes a channel value of a first slot, and $\hat{h}_1$ denotes a channel value of a second slot.

Specifically, when the environment of the channel through which the signal is transmitted is determined to be the low-speed channel environment by the control unit 250, the control unit 250 may perform control so that a correlation operation is performed on the data symbols included in the first slot. The control unit 250 may output only the data symbols included in the first slot among the reception symbol $y_i$ output from the base sequence and cyclic shift removal unit 240 to the first MUX 333. In other words, the base sequence and cyclic shift removal unit 240 may output a first symbol (i=0), a third symbol (i=2), a fourth symbol (i=3), a fifth symbol (i=4), and a seventh symbol (i=6) among symbols in the first slot, to the first MUX 333.

According to the embodiment of the present invention, when the environment of the channel through which the signal is transmitted is determined to be the low-speed channel environment by the control unit 250, the first MUX 333 may output the data symbols included in the first slot to the correlator 334. Here, the correlator 334 may perform a correlation operation on the input data symbols included in the first slot. In other words, the correlator 334 may output, to the channel adder and square calculator 338, a result value obtained by multiplying each of the data symbols included in the first slot by a codeword and then accumulating the multiplied values, that is, a value of $$\left(\sum_{\substack{i=0\\i\neq 1,5}}^{6}y_i c_{i,k}^*\right).$$

Here, the channel adder and square calculator 338 may add a multiple $2\hat{h}_0$ of the channel value of the DMRS included in the first slot to the value of $$\left(\sum_{\substack{i=0\\i\neq 1,5}}^{6}y_i c_{i,k}^*\right).$$

In addition, the channel adder and square calculator 338 may output a value of $$\left|\left(\sum_{\substack{i=0\\i\neq 1,5}}^{6}y_i c_{i,k}^*\right)+2\hat{h}_0\right|^2,$$

obtained by squaring the added value to the second MUX 335, and the second MUX 335 may output the value of $$\left| \left( \sum_{\substack{i=0 \\ i \neq 1,5}}^{6} y_i c_{i,k}^* \right) + 2\hat{h}_0 \right|^2$$

to the accumulator 336.

In addition, the control unit 250 may control a correlation operation on the data symbols included in the second slot. The base sequence and cyclic shift removal unit 240 may output, to the first MUX 333, a first symbol (i=7), a third symbol (i=9), a fourth symbol (i=10), a fifth symbol (i=11), and a seventh symbol (i=13) among symbols in the second slot.

According to the embodiment of the present invention, when the environment of the channel through which the signal is transmitted is determined to be a low-speed channel environment by the control unit 250, the first MUX 333 may output the data symbols included in the first slot to the correlator 334. Here, the correlator 334 may perform a correlation operation on the input data symbols included in the second slot. In other words, the correlator 334 may output a result value of $$\left( \sum_{\substack{i=7 \\ i \neq 8,12}}^{13} y_i c_{i,k}^* \right),$$

obtained by multiplying each of the data symbols included in the second slot by a codeword and then accumulating the multiplied values, to the channel adder and square calculator 338.

Here, the channel adder and square calculator 338 may add a multiple $2\hat{h}_1$ of the channel value of the DMRS included in the second slot to the value of $$\left( \sum_{\substack{i=7 \\ i \neq 8,12}}^{13} y_i c_{i,k}^* \right).$$

In addition, the channel adder and square calculator 338 may output a result value of $$\left| \left( \sum_{\substack{i=7 \\ i \neq 8,12}}^{13} y_i c_{i,k}^* \right) + 2\hat{h}_1 \right|^2,$$

obtained by squaring the added value to the second MUX 335, and the second MUX 335 may output the value of $$\left| \left( \sum_{\substack{i=7 \\ i \neq 8,12}}^{13} y_i c_{i,k}^* \right) + 2\hat{h}_1 \right|^2$$

to the accumulator 336.

Consequently, the accumulator 336 may accumulate a value output from the second MUX 335 for the first slot and a value output from the second MUX 335 for the second slot. In other words, the accumulator 336 may add a first result value of $$\left| \left( \sum_{\substack{i=0 \\ i \neq 1,5}}^{6} y_i c_{i,k}^* \right) + 2\hat{h}_0 \right|^2$$

and a second result value of $$\left| \left( \sum_{\substack{i=7 \\ i \neq 8,12}}^{13} y_i c_{i,k}^* \right) + 2\hat{h}_1 \right|^2,$$

and may output the added value to the comparator and selector 337. Here, the first result value of $$\left| \left( \sum_{\substack{i=0 \\ i \neq 1,5}}^{6} y_i c_{i,k}^* \right) + 2\hat{h}_0 \right|^2$$

is obtained by adding the value obtained by multiplying each of the data symbols included in the first slot by the codeword and the channel value of the DMRS included in the first slot and then squaring the added result. The second result value of $$\left| \left( \sum_{\substack{i=7 \\ i \neq 8,12}}^{13} y_i c_{i,k}^* \right) + 2\hat{h}_1 \right|^2$$

is obtained by adding the value obtained by multiplying each of the data symbols included in the second slot by the codeword and the channel value of the DMRS included in the second slot and then squaring the added result. In this case, the comparator and selector 337 may perform a comparison operation according to Equation 3, and thereby may determine a codeword corresponding to a maximum value among values obtained by accumulating the first result value and the second result value to be the transmission signal.

Figure 4:
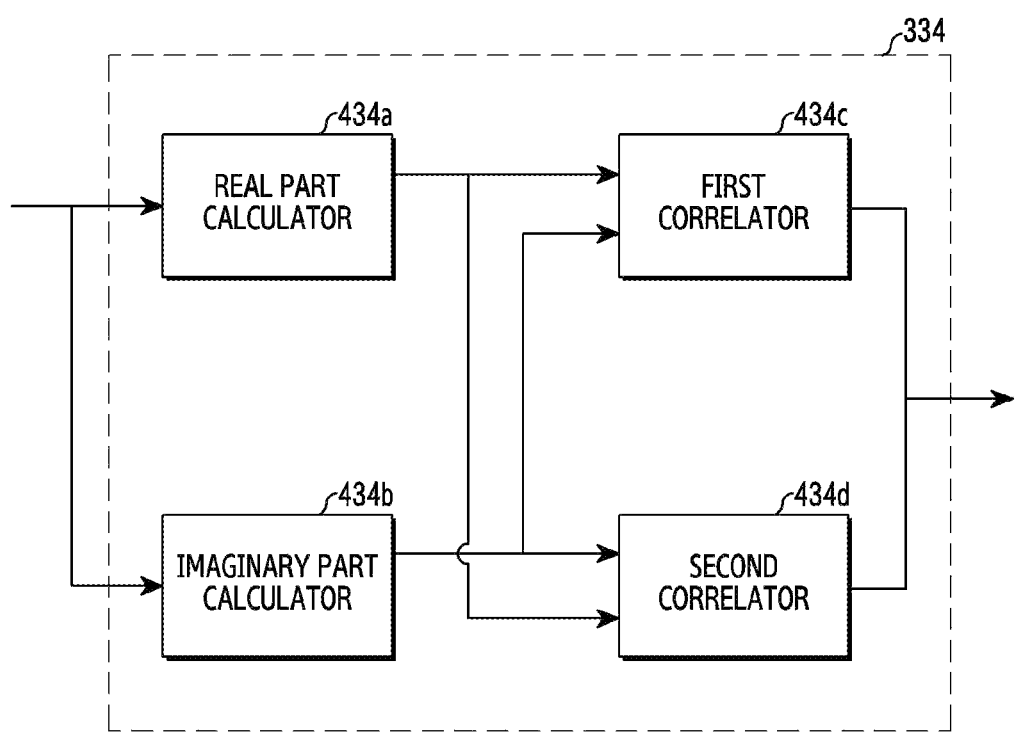
FIG. 4 shows the configuration of a correlator included in a reception device according to an embodiment of the present invention.

FIG. 4 shows the configuration of a correlator included in a reception device according to an embodiment of the present invention. FIG. 4 illustrates the configuration of the correlator 334 shown in FIG. 3.

According to the embodiment of the present invention, the correlator 334 shown in FIG. 3 may be implemented in detail as shown in FIG. 4. In this case, the correlator 334 may include a real part calculator 434a, an imaginary part calculator 434b, a first correlator 434c, and a second correlator 434d. Here, the real part calculator 434a may perform a function of outputting a real part of input complex symbols to the first correlator 434c and the second correlator 434d. In addition, the imaginary part calculator 434b may perform a function of outputting an imaginary part of the input complex symbols to the first correlator 434c and the second correlator 434d. In addition, the first correlator 434c may perform a correlation operation based on result values output from the real part calculator 434a and the imaginary part calculator 434b, and the second correlator 434d may perform a correlation operation based on the result values output from the real part calculator 434a and the imaginary part calculator 434b.

According to the embodiment of the present invention, the first correlator 434c and the second correlator 434d may be implemented by applying a fast Hadamard transform (FHT) structure, and the control unit 250 shown in FIG. 3 may control the operation of the correlator 334 differently according to predetermined channel environment information. In other words, the control unit 250 may control the operation of the correlator 334 differently according to whether an environment of a channel through which a signal is transmitted from a transmission terminal is a high-speed channel environment or a low-speed channel environment. Hereinafter, an example in which the correlator 334 operates differently according to the channel environment under the assumption that a correlation operation is performed on the reception symbol $y_i$ for each slot will be described in detail.

According to the embodiment of the present invention, when the environment of the channel through which the signal is transmitted is determined to be the high-speed channel environment by the control unit 250 shown in FIG. 3, the control unit 250 may control the channel estimator 331, the channel compensator 332, the first MUX 333, the correlator 334, the second MUX 335, the accumulator 336, and the comparator and selector 337, which are included in the transmission signal detection unit 230, to perform the respective operations thereof. In particular, the channel estimator 331 may perform channel estimation on data symbols included in the reception symbol $y_i$, based on DMRSs included in the reception symbol $y_i$ output from the base sequence and cyclic shift removal unit 240. In addition, the channel estimator 331 may output a channel estimation value $\hat{h}^*_i$ related to the data symbol included in the reception symbol $y_i$ to the channel compensator 332. Here, the channel compensator 332 may perform channel compensation on the reception symbol $y_i$ using the channel estimation value. Specifically, the channel compensator 332 may output a result value $[\hat{h}^*_i y_i]$, obtained by multiplying the reception symbol $y_i$ by the channel estimation value, to the first MUX 333. In this case, the first MUX 333 may output the input value of $[\hat{h}^*_i y_i]$ to the correlator 334.

According to the embodiment of the present invention, when the environment of the channel through which the signal is transmitted is determined to be the high-speed channel environment by the control unit 250, the control unit 250 may control the real part calculator 434a and the first correlator 434c included in the correlator 334 to perform the respective operations thereof. In this case, the value of $[\hat{h}^*_i y_i]$ output from the first MUX 333 may be input to the real part calculator 434a, and the real part calculator 434a may calculate a real part of the value of $[\hat{h}^*_i y_i]$ and output the calculated real part to the first correlator 434c.

Here, the first correlator 434c may perform a correlation operation on data symbols included in a first slot, and thereby output a value of $$\operatorname{Re}\left(\sum_{\substack{i=0\\i\neq 1,5}}^{6}[\hat{h}^*_i y_i]c^*_{i,k}\right)$$

to the second MUX 335. The second MUX 335 may output the value of $$\operatorname{Re}\left(\sum_{\substack{i=0\\i\neq 1,5}}^{6}[\hat{h}^*_i y_i]c^*_{i,k}\right)$$

to the accumulator 336.

In addition, the first correlator 434c may perform a correlation operation on data symbols included in a second slot, and thereby output a value of $$\operatorname{Re}\left(\sum_{\substack{i=7\\i\neq 8,12}}^{13}[\hat{h}^*_i y_i]c^*_{i,k}\right)$$

to the second MUX 335. The second MUX 335 may output the value of $$\operatorname{Re}\left(\sum_{\substack{i=7\\i\neq 8,12}}^{13}[\hat{h}^*_i y_i]c^*_{i,k}\right)$$

to the accumulator 336.

Accordingly, the accumulator 336 may accumulate the value of $$\operatorname{Re}\left(\sum_{\substack{i=0\\i\neq 1,5}}^{6}[\hat{h}^*_i y_i]c^*_{i,k}\right)$$

and the value of $$\operatorname{Re}\left(\sum_{\substack{i=7\\i\neq 8,12}}^{13}[\hat{h}^*_i y_i]c^*_{i,k}\right)$$

according to a correlation operation result calculated for each slot, and may output the accumulated value to the comparator and selector 337. The comparator and selector 337 may determine a codeword corresponding to a maximum value among the accumulated values to be a transmission signal based on the result of the comparison operation on the accumulated value.

According to the embodiment of the present invention, when the environment of the channel through which the signal is transmitted is determined to be the low-speed channel environment by the control unit 250, the control unit 250 may control the first MUX 333, the correlator 334, the channel adder and square calculator 338, the second MUX 335, the accumulator 336, and the comparator and selector 337, which are included in the transmission signal detection unit 230, to perform the respective operations thereof.

First, the control unit 250 may control a correlation operation on the data symbols included in the first slot to be performed. According to the embodiment of the present invention, when 14 symbols are present in the reception symbol $y_i$ on the basis of one subframe, 10 symbols among them are determined to be data symbols, and the remaining 4 symbols are determined to be DMRSs, 5 data symbols and 2 DMRSs may be included in the first slot. For example, in the first slot, a second symbol (i=1) and a sixth symbol (i=5) may be determined to be the DMRSs, and a first symbol (i=0), a third symbol (i=2), a fourth symbol (i=3), a fifth symbol (i=4), and a seventh symbol (i=6) may be determined to be the data symbols.

In this case, the control unit 250 may output only the data symbols included in the first slot, among the reception symbol $y_i$ output from the base sequence and cyclic shift removal unit 240, to the first MUX 333. In other words, the base sequence and cyclic shift removal unit 240 may output the first symbol (i=0), the third symbol (i=2), the fourth symbol (i=3), the fifth symbol (i=4), and the seventh symbol (i=6), among symbols in the first slot, to the first MUX 333. The first MUX 333 may output the data symbols $y_i$ included in the first slot to the correlator 334.

Here, the correlator 334 may perform a correlation operation on the input data symbols included in the first slot. In other words, the correlator 334 may calculate a result value of $$\left( \sum_{\substack{i=0 \\ i \neq 1,5}}^{6} y_i c_{i,k}^* \right),$$

obtained by multiplying each of the data symbols included in the first slot by a codeword and then accumulating the multiplied values. Here, the value of $$\left( \sum_{\substack{i=0 \\ i \neq 1,5}}^{6} y_i c_{i,k}^* \right)$$

has an equivalent relationship with the value of $$\sum_{\substack{i=0 \\ i \neq 1,5}}^{6} \text{Re}\{y_i c_{i,k}^*\} + \sum_{\substack{i=0 \\ i \neq 1,5}}^{6} \text{Im}\{y_i c_{i,k}^*\}.$$

Here, the value of $$\sum_{\substack{i=0 \\ i \neq 1,5}}^{6} \text{Re}\{y_i c_{i,k}^*\}$$

has an equivalent relationship with the value of $$\sum_{\substack{i=0 \\ i \neq 1,5}}^{6} \text{Re}\{y_i\}\text{Re}\{c_{i,k}\} + \text{Im}\{y_i\}\text{Im}\{c_{i,k}\},$$

and the value of $$\sum_{\substack{i=0 \\ i \neq 1,5}}^{6} \text{Im}\{y_i c_{i,k}^*\}$$

has an equivalent relationship with the value of $$\sum_{\substack{i=0 \\ i \neq 1,5}}^{6} \text{Im}\{y_i\}\text{Re}\{c_{i,k}\} - \text{Re}\{y_i\}\text{Im}\{c_{i,k}\}.$$

Accordingly, the control unit 250 may control the operation of the correlator 334 based on the above-described equivalent relationships.

Specifically, the data symbols $y_i$ output from the first MUX 333 may be respectively input to the real part calculator 434a and the imaginary part calculator 434b. Here, the real part calculator 434a may output a real part $\text{Re}\{y_i\}$ of the data symbols $y_i$ to each of the first correlator 434c and the second correlator 434d. In addition, the imaginary part calculator 434b may output an imaginary part $\text{Im}\{y_i\}$ of the data symbols $y_i$ to each of the first correlator 434c and the second correlator 434d.

Here, the first correlator 434c may calculate a result value of $$\sum_{\substack{i=0 \\ i \neq 1,5}}^{6} \text{Re}\{y_i\}\text{Re}\{c_{i,k}\} + \text{Im}\{y_i\}\text{Im}\{c_{i,k}\},$$

obtained by performing a combination of multiplication and addition operations on the value of $\text{Re}\{y_i\}$, output from the real part calculator 434a and the value of $\text{Im}\{y_i\}$, output from the imaginary part calculator 434b, that is, a value of $$\sum_{\substack{i=0 \\ i \neq 1,5}}^{6} \text{Re}\{y_i c_{i,k}^*\}.$$

In addition, the second correlator 434d may calculate a result value of $$\sum_{\substack{i=0 \\ i \neq 1,5}}^{6} \text{Im}\{y_i\}\text{Re}\{c_{i,k}\} - \text{Re}\{y_i\}\text{Im}\{c_{i,k}\},$$

obtained by performing a combination of multiplication and addition operations on the value of $\text{Re}\{y_i\}$ output from the real part calculator 434a and the value of $\text{Im}\{y_i\}$ output from the imaginary part calculator 434b, that is, a value of $$\sum_{\substack{i=0 \\ i \neq 1,5}}^{6} \text{Im}\{y_i c_{i,k}^*\}.$$

As a result, the correlator 333 may add the value of $$\sum_{\substack{i=0 \\ i \neq 1,5}}^{6} \mathrm{Re}\{y_i c_{i,k}^*\}$$

and the value of $$\sum_{\substack{i=0 \\ i \neq 1,5}}^{6} \mathrm{Im}\{y_i c_{i,k}^*\},$$

and may output the result of addition thereof to the channel adder and square calculator 338.

Here, the channel adder and square calculator 338 may add the channel value of the DMRS included in the first slot to the value obtained by adding the value of $$\sum_{\substack{i=0 \\ i \neq 1,5}}^{6} \mathrm{Re}\{y_i c_{i,k}^*\}$$

and the value of $$\sum_{\substack{i=0 \\ i \neq 1,5}}^{6} \mathrm{Im}\{y_i c_{i,k}^*\}.$$

In addition, a result value of $$\left| \left( \sum_{\substack{i=0 \\ i \neq 1,5}}^{6} y_i c_{i,k}^* \right) + 2\hat{h}_0 \right|^2$$

obtained by squaring the result of addition may be output to the second MUX 335, and the second MUX 335 may output the result value obtained by squaring the result value obtained by adding the channel values to the accumulator 336.

In addition, the control unit 250 may perform control so that a correlation operation is performed on the data symbols included in the second slot. According to the embodiment of the present invention, when 14 symbols are present in the reception symbol $y_i$ on the basis of one subframe, 10 symbols among them are determined to be data symbols, and the remaining 4 symbols are determined to be DMRSs, 5 data symbols and 2 DMRSs may be included in the second slot. For example, in the second slot, a second symbol (i=8) and a sixth symbol (i=12) are determined to be the DMRSs, and a first symbol (i=7), a third symbol (i=9), a fourth symbol (i=10), a fifth symbol (i=11), and a seventh symbol (i=13) may be determined to be the data symbols.

In this case, the control unit 250 may output only the data symbols included in the second slot, among the reception symbol $y_i$ output from the base sequence and cyclic shift removal unit 240, to the first MUX 333. In other words, the base sequence and cyclic shift removal unit 240 may output the first symbol (i=7), the third symbol (i=9), the fourth symbol (i=10), the fifth symbol (i=11), and the seventh symbol (i=13), among symbols in the second slot, to the first MUX 333. The first MUX 333 may output the data symbols $y_i$ included in the second slot to the correlator 334.

Here, the correlator 334 may perform a correlation operation on the input data symbols included in the second slot. In other words, the correlator 334 may calculate a result value of $$\left( \sum_{\substack{i=7 \\ i \neq 8,12}}^{13} y_i c_{i,k}^* \right),$$

obtained by multiplying each of the data symbols included in the second slot by the codeword and then accumulating the multiplied values. Here, the value of $$\left( \sum_{\substack{i=7 \\ i \neq 8,12}}^{13} y_i c_{i,k}^* \right)$$

is in an equivalent relationship with a value of $$\sum_{\substack{i=7 \\ i \neq 8,12}}^{13} \mathrm{Re}\{y_i c_{i,k}^*\} + \sum_{\substack{i=7 \\ i \neq 8,12}}^{13} \mathrm{Im}\{y_i c_{i,k}^*\}.$$

Here, the value of $$\sum_{\substack{i=7 \\ i \neq 8,12}}^{13} \mathrm{Re}\{y_i c_{i,k}^*\}$$

is in an equivalent relationship with a value of $$\sum_{\substack{i=7 \\ i \neq 8,12}}^{13} \mathrm{Re}\{y_i\}\mathrm{Re}\{c_{i,k}\} + \mathrm{Im}(y_i)\mathrm{Im}\{c_{i,k}\},$$

and the value of $$\sum_{\substack{i=7 \\ i \neq 8,12}}^{13} \mathrm{Im}\{y_i c_{i,k}^*\}$$

is in an equivalent relationship with a value of $$\sum_{\substack{i=7 \\ i \neq 8,12}}^{13} \mathrm{Im}\{y_i\}\mathrm{Re}\{c_{i,k}\} - \mathrm{Im}\{y_i\}\mathrm{Im}\{c_{i,k}\}.$$

Accordingly, the control unit 250 may control the operation of the correlator 334 based on the above-described equivalent relationship.

Specifically, the data symbols $y_i$ output from the first MUX 333 may be respectively input to the real part calculator 434a and the imaginary part calculator 434b. Here, the real part calculator 434a may output a real part $\mathrm{Re}\{y_i\}$ of the data symbols $y_i$ to each of the first correlator 434c and the second correlator 434d. In addition, the imaginary part calculator 434b may output an imaginary part $\mathrm{Im}\{y_i\}$ of the data symbols $y_i$ to each of the first correlator 434c and the second correlator 434d.

Here, the first correlator 434c may calculate a result value of $$\sum_{\substack{i=7 \\ i \neq 8,12}}^{13} \mathrm{Re}\{y_i\}\mathrm{Re}\{c_{i,k}\} + \mathrm{Im}\{y_i\}\mathrm{Im}\{c_{i,k}\},$$

obtained by performing a combination of multiplication and addition operations on the value of $\mathrm{Re}\{y_i\}$ output from the real part calculator 434a and the value of $\mathrm{Im}\{y_i\}$ output from the imaginary part calculator 434b, that is, a value of $$\sum_{\substack{i=7 \\ i \neq 8,12}}^{13} \mathrm{Re}\{y_i c_{i,k}^*\}.$$

In addition, the second correlator 434d may calculate a result value of $$\sum_{\substack{i=7 \\ i \neq 8,12}}^{13} \mathrm{Im}\{y_i\}\mathrm{Re}\{c_{i,k}\} - \mathrm{Im}\{y_i\}\mathrm{Im}\{c_{i,k}\},$$

obtained by performing a combination of multiplication and addition operations on the value of $\mathrm{Re}\{y_i\}$ output from the real part calculator 434a and the value of $\mathrm{Im}\{y_i\}$ output from the imaginary part calculator 434b, that is, a value of $$\sum_{\substack{i=7 \\ i \neq 8,12}}^{13} \mathrm{Im}\{y_i c_{i,k}^*\}.$$

As a result, the correlator 334 may add the value of $$\sum_{\substack{i=7 \\ i \neq 8,12}}^{13} \mathrm{Re}\{y_i c_{i,k}^*\}$$

and the value of $$\sum_{\substack{i=7 \\ i \neq 8,12}}^{13} \mathrm{Im}\{y_i c_{i,k}^*\},$$

and may output the added value to the channel adder and square calculator 338.

Here, the channel adder and square calculator 338 may add the channel value of the DMRS included in the first slot to the value obtained by adding the value of $$\sum_{\substack{i=7 \\ i \neq 8,12}}^{13} \mathrm{Re}\{y_i c_{i,k}^*\}$$

and the value of $$\sum_{\substack{i=7 \\ i \neq 8,12}}^{13} \mathrm{Im}\{y_i c_{i,k}^*\}.$$

In addition, a result value of $$\left|\left(\sum_{\substack{i=7 \\ i \neq 8,12}}^{13} y_i c_{i,k}^*\right) + 2\hat{h}_1\right|^2$$

obtained by squaring the result of addition may be output to the second MUX 335, and the second MUX 335 may output the result value obtained by squaring the result value obtained by adding the channel values to the accumulator 336.

Consequently, the accumulator 336 may accumulate a value output from the second MUX 335 for the first slot and a value output from the second MUX 335 for the second slot. In other words, the accumulator 336 may add a first result value of $$\left|\left(\sum_{\substack{i=0 \\ i \neq 1,5}}^{6} y_i c_{i,k}^*\right) + 2\hat{h}_0\right|^2$$

and a second result value of $$\left| \left( \sum_{\substack{i=7 \\ i \neq 8,12}}^{13} y_i c_{i,k}^* \right) + 2\hat{h}_1 \right|^2,$$

and may output the resultant value to the comparator and selector 337. Here, the first result value of $$\left| \left( \sum_{\substack{i=0 \\ i \neq 1,5}}^{6} y_i c_{i,k}^* \right) + 2\hat{h}_0 \right|^2$$

is obtained by adding the value obtained by multiplying each of the data symbols included in the first slot by the codeword and the channel value of the DMRS included in the first slot and then squaring the result of addition. The second result value of $$\left| \left( \sum_{\substack{i=7 \\ i \neq 8,12}}^{13} y_i c_{i,k}^* \right) + 2\hat{h}_1 \right|^2$$

is obtained by adding the value obtained by multiplying each of the data symbols included in the second slot by the codeword and the channel value of the DMRS included in the second slot and then squaring the result of addition. In this case, the comparator and selector 337 may perform a comparison operation according to Equation 3, and thereby may determine a codeword corresponding to a maximum value among values obtained by accumulating the first result value and the second result value to be the transmission signal.

Figure 5:
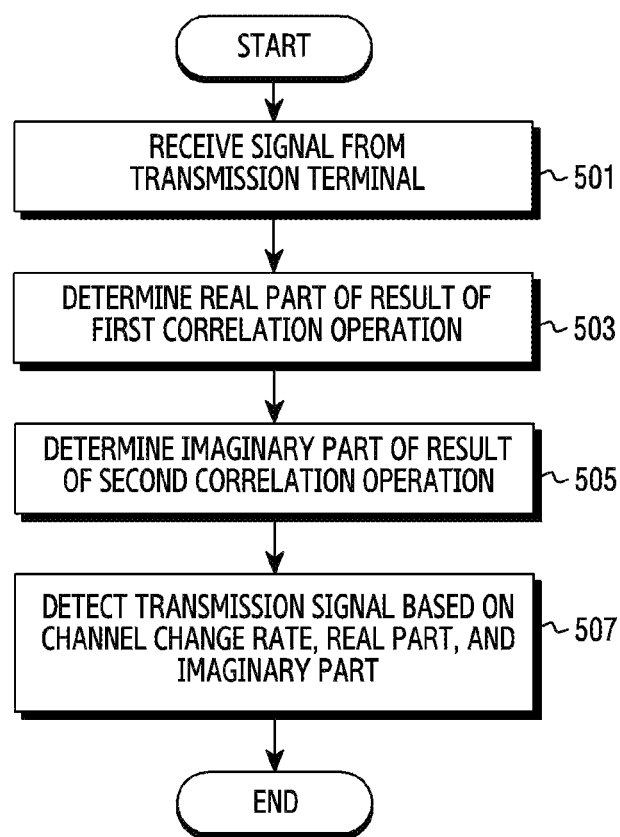
FIG. 5 is a flowchart showing the operation of a reception device according to an embodiment of the present invention.

FIG. 5 is a flowchart showing the operation of a reception device according to an embodiment of the present invention.

First, in operation 501, the transceiver 110 shown in FIG. 1 may receive a signal from a transmission terminal. In this case, a reception signal received from the transmission terminal may be output to the transmission signal detection unit 130 shown in FIG. 1.

Next, in operation 503, the first correlator 134c included in the transmission signal detection unit 130 may perform a first correlation operation, and may determine a real part of the result of the first correlation operation. In other words, the first correlator 134c may perform the first correlation operation on a reception signal or a reception symbol output from the transceiver 110, may determine the real part of the result of the first correlation operation, and may output the determined real part to the control unit 150.

In addition, in operation 505, the second correlator 134d included in the transmission signal detection unit 130 may perform a second correlation operation and may determine an imaginary part of the result of the second correlation operation. In other words, the second correlator 134d may perform the second correlation operation on a reception signal or a reception symbol output from the transceiver 110, may determine an imaginary part of the result of the second correlation operation, and may output the determined imaginary part to the control unit 150.

Finally, in operation 507, the control unit 150 may detect a transmission signal based on a channel change rate, the real part, and the imaginary part. According to the embodiment of the present invention, when the channel change rate is equal to or greater than a threshold value, the transmission signal may be detected based on the real part, and when the channel change rate is less than the threshold value, the transmission signal may be detected based on a combination of the real part and the imaginary part.

Figure 6:
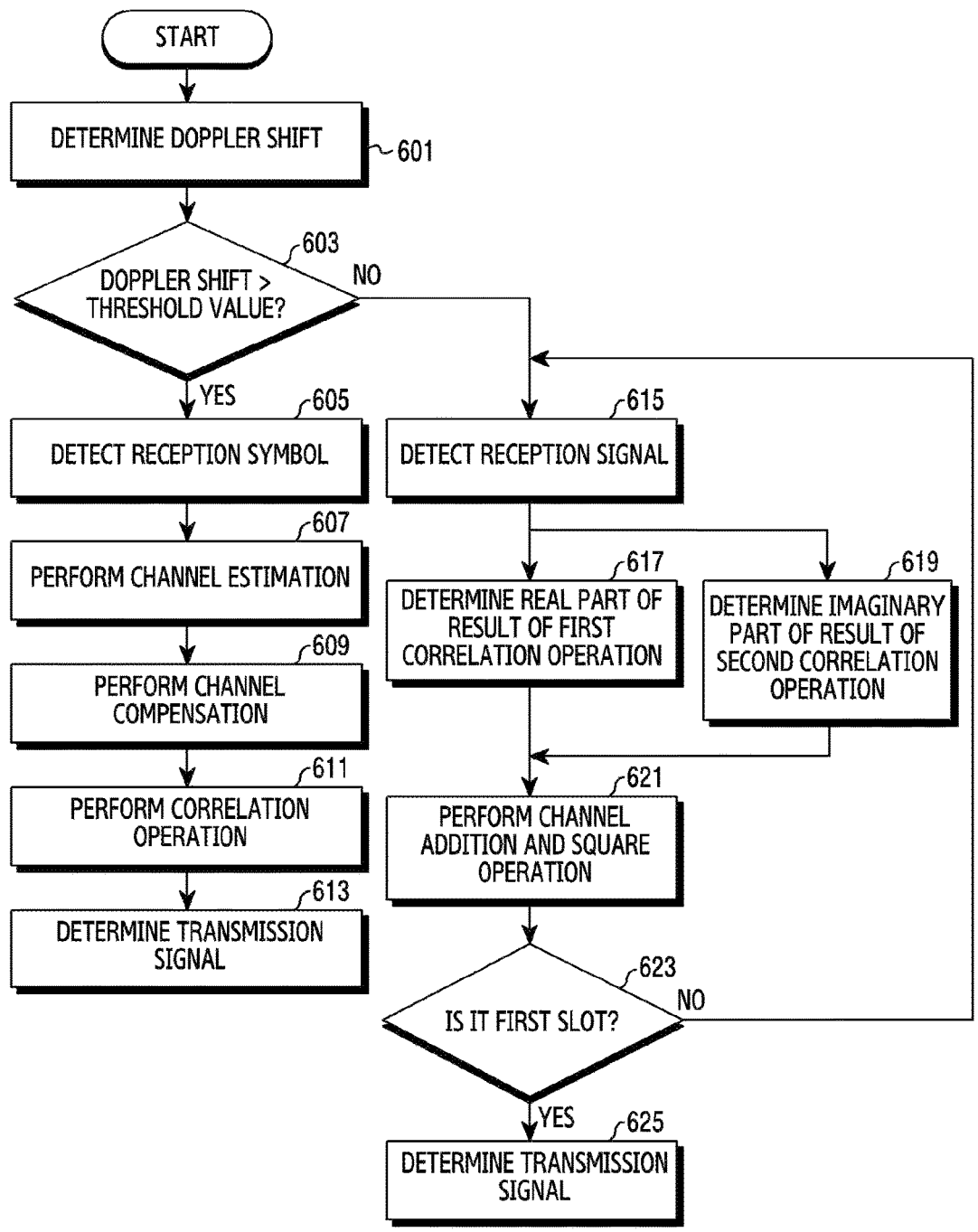
FIG. 6 is a flowchart showing the operation of a reception device according to another embodiment of the present invention.

FIG. 6 is a flowchart showing the operation of a reception device according to another embodiment of the present invention.

First, in operation 601, a Doppler shift may be determined. According to the embodiment of the present invention, the Doppler shift confirmation unit 260 shown in FIG. 2 may determine the Doppler shift by confirming a frequency change of a signal received from a transmission terminal.

Next, in operation 603, the control unit 250 shown in FIG. 3 (or the control unit 150 shown in FIG. 1) may determine whether the Doppler shift is equal to or greater than a threshold value. When the determined Doppler shift, that is, a frequency change value of the signal received from the transmission terminal, is equal to or greater than the threshold value, the control unit 250 may determine that the environment of a channel through which the signal is transmitted is changed relatively rapidly. In other words, the control unit 250 may determine that the environment of the channel through which the signal is transmitted is a high-speed channel environment, in which case the corresponding operation proceeds to operation 605.

When the determined Doppler shift, that is, the frequency change value of the signal received from the transmission terminal, is less than the threshold value, the control unit 250 may determine that the environment of the channel through which the signal is transmitted is changed relatively slow. In other words, the control unit 250 may determine that the environment of the channel through which the signal is transmitted is a low-speed channel environment, and in this case, the corresponding operation proceeds to operation 615.

First, when the corresponding operation proceeds to operation 615, in operation 605, the reception symbol may be detected by the transmission signal detection unit 230 (or the transmission signal detection unit 130 shown in FIG. 1).

In addition, in operation 607, the channel estimator 331 included in the transmission signal detection unit 230 may perform channel estimation on a data symbol included in the reception symbol based on a DMRS included in the reception symbol. In this case, the channel estimator 331 may output a channel estimation value related to the data symbol included in the reception symbol to the channel compensator 332 included in the transmission signal detection unit 230.

Next, in operation 609, the channel compensator 332 may perform channel compensation on the reception symbol using the channel estimate value. Specifically, the channel compensator 332 may output a result value obtained by multiplying the reception symbol by the channel estimation value to the correlator 334 included in the transmission signal detection unit 230.

In addition, in operation 611, the correlator 334 may perform a correlation operation on the result value obtained by multiplying the reception symbol by the channel estimation value. In other words, the correlator 334 may output a result value obtained by multiplying the result value, obtained by multiplying the reception symbol by the channel estimation value, by a codeword and then accumulating the multiplied values, to the comparator and selector 337 included in the transmission signal detection unit 230.

Next, in operation 613, the comparator and selector 337 may perform a comparison operation to determine a codeword corresponding to a maximum value among the accumulated result values obtained by multiplying the result value, obtained by multiplying the reception symbol by the channel estimation value, by the codeword to be the transmission signal.

When the corresponding operation proceeds to operation 615 from operation 603, in operation 615, the reception symbol may be detected by the transmission signal detection unit 230 (or the transmission signal detection unit 130 shown in FIG. 1). In this case, the reception symbols may be divided in units of slots, some of the reception symbols may be included in the first slot, and the remaining reception symbols may be included in the second slot.

Next, in operation 617, the first correlator 434c included in FIG. 4 may perform a first correlation operation, may determine a real part of the result of the first correlation operation, and may output the determined real part to the channel adder and square calculator 338 shown in FIG. 3. In other words, according to the embodiment of the present invention, the first correlator 434c may output a real part of a result value, obtained by multiplying each of the data symbols included in the first slot among the reception symbols by a codeword and then accumulating the multiplied values, to the channel adder and square calculator 338.

In addition, in operation 619, the second correlator 434d included in FIG. 4 may perform a second correlation operation, may determine an imaginary part of the result of the second correlation operation, and may output the determined imaginary part to the channel adder and square calculator 338 shown in FIG. 3. In other words, according to the embodiment of the present invention, the second correlator 434d may output an imaginary part of the result value, obtained by multiplying each of the data symbols included in the first slot among the reception symbols by the codeword and then accumulating the multiplied values, to the channel adder and square calculator 338 shown in FIG. 3.

Next, in operation 612, the channel adder and square calculator 338 may perform channel addition and square operations. In other words, the channel adder and square calculator 338 may determine a first value obtained by adding the real part of the result value obtained by multiplying each of the data symbols included in the first slot by the codeword and then accumulating the multiplied values and the imaginary part of the result value obtained by multiplying each of the data symbols included in the first slot by the codeword and then accumulating the multiplied values, may determine a second value obtained by adding a channel value of the DMRS included in the first slot to the first value, and may then determine a squared value of the second value. In this case, the channel adder and square calculator 338 may output the squared value to the accumulator 336.

Next, in operation 623, the control unit 250 may determine whether the current operation is performed in the first slot. According to the embodiment of the present invention, whether the operation has been performed in the first slot may be determined. At this time, when the operation is performed in the first slot, the corresponding operation may proceed to operation 625. When the operation is not performed in the first slot, the corresponding operation may return to operation 615, and the operation for the second slot may be performed in operations 615 to 621. As a result, the accumulator 336 may accumulate the squared value calculated for the first slot and the squared value calculated for the second slot, and may output the accumulated value to the comparison and the selector.

When the corresponding operation proceeds to operation 625 from operation 623, the comparator and selector 337 may perform a comparison operation to determine a codeword corresponding to a maximum value among result values obtained by accumulating the squared value calculated for the first slot and the squared value calculated for the second slot to be the transmission signal.

Figure 7:
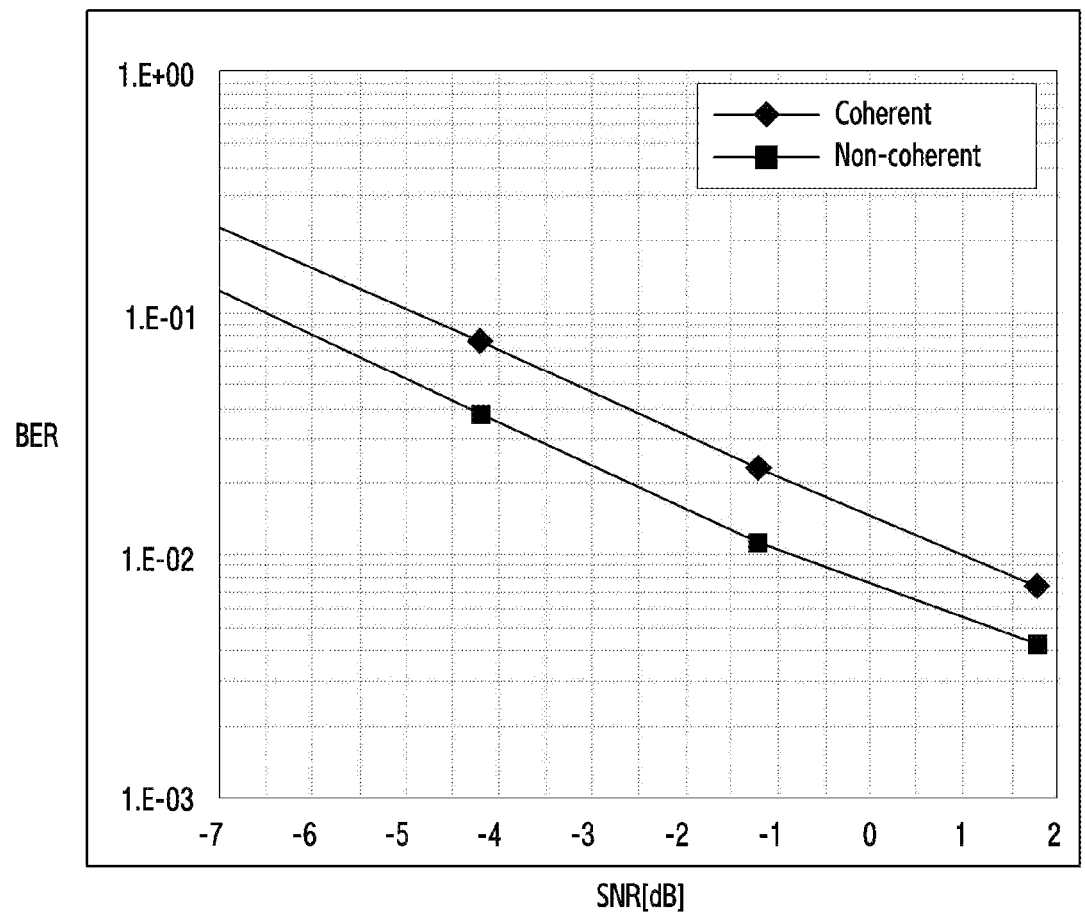
FIG. 7 shows a graph that compares performance between reception devices according to an embodiment of the present invention.

FIG. 7 shows a graph comparing the performance between reception devices according to an embodiment of the present invention.

FIG. 7 is a graph that compares the performance between reception devices in a low-speed channel environment according to an embodiment of the present invention. In FIG. 7, the horizontal axis indicates a signal-to-noise ratio (SNR), and the vertical axis indicates a bit error rate (BER). Referring to FIG. 7, it can be seen that the BER of a non-coherent reception scheme is lower than the BER of a coherent reception scheme in the low-speed channel environment. In this manner, according to the embodiment of the present invention, in the low-speed channel environment, excellent reception performance may be realized by detecting a transmission signal using the non-coherent reception scheme, in the correlator 334 of FIG. 3.

Figure 8:
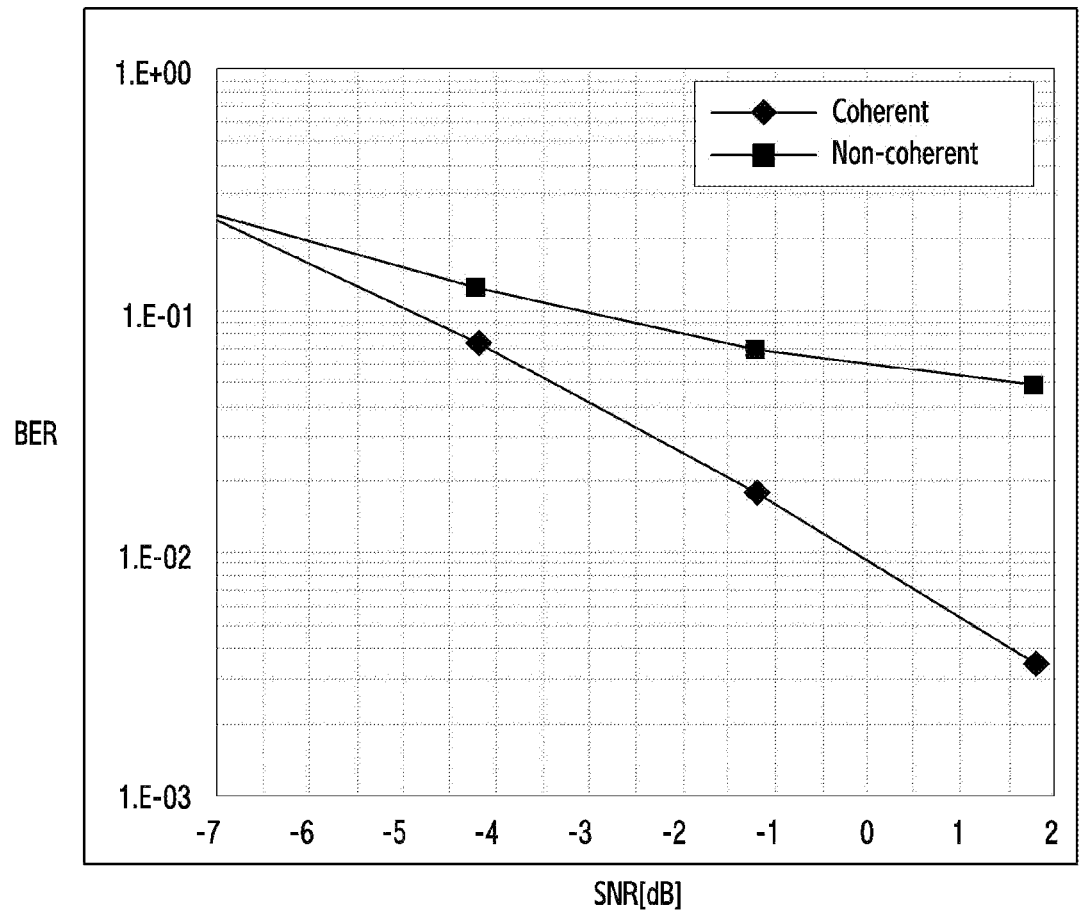
FIG. 8 shows a graph that compares performance between reception devices according to another embodiment of the present invention.

FIG. 8 shows a graph that compares performance between reception devices according to another embodiment of the present invention.

FIG. 8 is a graph that compares performance between reception devices in a high-speed channel environment according to another embodiment of the present invention. In FIG. 8, the horizontal axis indicates an SNR, and the vertical axis indicates a BER. Referring to FIG. 8, it can be seen that the BER of a coherent reception scheme is lower than the BER of a non-coherent reception scheme in the high-speed channel environment. In this manner, according to the embodiment of the present invention, in the high-speed channel environment, excellent reception performance may be realized by detecting a transmission signal using the coherent reception scheme, in the correlator 334 of FIG. 3.

Although the present invention has been described by the restricted embodiments and the drawings as described above, the present invention is not limited to the aforementioned embodiments and various modifications and alterations can be made from the descriptions by those skilled in the art to which the present invention pertains. Operations according to an embodiment of the present invention may be implemented by a single controller. In this case, program instructions for performing various computer-implemented operations may be stored in a computer-readable medium. The computer readable medium may include a program command, a data file, a data structure, and the like independently or in combination. The program command may be things specially designed and configured for the present invention, or things that are well known to and can be used by those skilled in the related art. Examples of the computer readable recoding medium include magnetic media such as a hard disk, a floppy disk, and a magnetic tape, optical media such as a compact disc-read only memory (CD-ROM) and a digital video disc (DVD), magneto-optical media such as a floptical disk, and hardware devices such as a read only memory (ROM), a random access memory (RAM), and a flash memory, which are specially constructed in such a manner that they can store and execute a program command. Examples of the program command include a machine language code generated by a compiler and a high-level language code executable by a computer through an interpreter and the like. When all or some of the base stations or relays as described in the present invention are implemented by a computer program, a computer-readable recording medium in which the computer program is stored also falls within the present invention. Therefore, the scope of the present invention should not be defined as being limited to the embodiments, but should be defined by the appended claims and equivalents thereof.

The invention claimed is:

1. A reception device in a wireless communication system, comprising:
   a transceiver;
   at least one processor comprising a control circuit and a detecting circuit; and
   a correlating circuit comprised in the detecting circuit, wherein the control circuit is configured to:
      if a doppler shift value is equal to or greater than a threshold, control to input a signal that is received from a transmission device and an estimated channel between the reception device and the transmission device into the correlating circuit, and control to perform a first correlation operation at the correlating circuit,
      if the doppler shift value is less than the threshold, control to input the signal into the correlating circuit, and control to perform the first correlation operation and a second correlation operation at the correlating circuit, and
      control to detect the signal in the detecting circuit by using at least one value determined through the first correlation operation and the second correlation operation, and
   wherein the doppler shift value of the channel between the reception device and the transmission device is determined based on the signal received from the transmission device.

2. The reception device of claim 1, wherein the detecting circuit is further configured to:
   estimate a channel of a data symbol included in the signal based on a reference symbol included in the signal; and
   perform channel compensation on the signal using a channel estimation value.

3. The reception device of claim 2, wherein the correlating circuit is further configured to determine a real part among a result of the first correlation operation.

4. The reception device of claim 3, wherein the correlating circuit is further configured to:
   if the doppler shift value of the signal is equal to or greater than the threshold, perform the first correlation operation by calculating accumulated result values obtained by multiplying the signal, on which the channel compensation has been performed, by codewords, and
   determine real part values for each of the accumulated result values.

5. The reception device of claim 4, wherein the detecting circuit is further configured to determine a codeword corresponding to a maximum value among the real part values of the accumulated result values to be the signal.

6. The reception device of claim 1, wherein the correlating circuit is further configured to:
   determine a real part among a result of the first correlation operation, and
   determine an imaginary part among a result of the second correlation operation.

7. The reception device of claim 6, wherein the correlating circuit is further configured to:
   if the doppler shift value of the signal is less than a threshold value,
   perform the first correlation operation by calculating accumulated result values obtained by multiplying the signal by codewords,
   determine real part values for each of the accumulated result values,
   perform the second correlation operation by calculating the accumulated result values obtained by multiplying the signal by the codewords, and
   determine imaginary part values for each of the accumulated result values.

8. The reception device of claim 7, wherein the detecting circuit is further configured to add each real part value and a channel value of a reference symbol included in the signal.

9. The reception device of claim 8, wherein the detecting circuit is further configured to add each imaginary part value and the channel value.

10. The reception device of claim 7, wherein the detecting circuit is further configured to determine a codeword corresponding to a maximum value among the real part values of the accumulated result values and the imaginary part values of the accumulated result values to be the signal.

11. A method of operating a reception device in a wireless communication system, the method comprising:
   if a doppler shift value is equal to or greater than a threshold, inputting a signal that is received from a transmission device and an estimated channel between the reception device and the transmission device into a correlating circuit, and control to perform a first correlation operation at the correlating circuit;
   if the doppler shift value is less than the threshold, inputting the signal into the correlating circuit, and performing the first correlation operation and a second correlation operation at the correlating circuit; and
   detecting the signal by using at least one value determined through the first correlation operation and the second correlation operation, wherein the doppler shift value of the channel between the reception device and the transmission device is determined based on the signal received from the transmission device.

12. The method claim 11, further comprising:
   estimating a channel of a data symbol included in the signal, based on a reference symbol included in the signal; and
   performing channel compensation on the signal using a channel estimation value estimated.

13. The method of claim 12, wherein performing the first correlation operation comprises determining a real part among a result of the first correlation operation.

14. The method of claim 13, wherein determining the real part among the result of the first correlation operation comprises:
   if the doppler shift value of the signal is equal to or greater than the threshold, performing the first correlation operation by calculating accumulated result values obtained by multiplying the signal, on which the channel compensation has been performed, by a codeword; and
   determining real part values for each of the accumulated result values.

15. The method of claim 14, wherein detecting the signal comprises determining a codeword corresponding to a maximum value among the real part values of the accumulated result values to the signal.

16. The method of claim 11, further comprising:
determining a real part among a result of the first correlation operation; and
determining an imaginary part among a result of the second correlation operation.

17. The method of claim 16,
wherein the determining of the real part among the result of the first correlation operation comprises:
if the doppler shift value of the signal is less than a threshold value,
performing the first correlation operation by calculating accumulated result values obtained by multiplying the signal by codewords; and
determining real part values for each of the accumulated result values, and
wherein the determining of the imaginary part among the result of the second correlation operation comprises:
if the doppler shift value of the signal is less than the threshold value,
performing the second correlation operation by calculating the accumulated result values obtained by multiplying the signal by the codeword; and
determining imaginary part values for each of the accumulated result values.

18. The method of claim 17, further comprising:
adding each real part value and a channel value of a reference symbol included in the signal.

19. The method of claim 18, further comprising:
adding each imaginary part value and the channel value.

20. The method of claim 17, wherein detecting the signal comprises:
determining a codeword corresponding to a maximum value among the real part values of the accumulated result values and the imaginary part values of the accumulated result values to the signal.

* * * * *